US011865843B2

(12) United States Patent
Nakatani et al.

(10) Patent No.: US 11,865,843 B2
(45) Date of Patent: Jan. 9, 2024

(54) FLUID CARTRIDGE WITH VENTED INSERT

(71) Applicant: Funai Electric Co., Ltd., Osaka (JP)

(72) Inventors: Masaki Nakatani, Osaka (JP); Richard L. Warner, Lexington, KY (US); Sean T. Weaver, Lexington, KY (US)

(73) Assignee: FUNAI ELECTRIC CO., LTD

( * ) Notice: Subject to any disclaimer, the term of this patent is extended or adjusted under 35 U.S.C. 154(b) by 59 days.

(21) Appl. No.: 17/454,130

(22) Filed: Nov. 9, 2021

(65) Prior Publication Data

US 2023/0143469 A1 May 11, 2023

(51) Int. Cl.
*B41J 2/175* (2006.01)

(52) U.S. Cl.
CPC ......... *B41J 2/17513* (2013.01); *B41J 2/1753* (2013.01); *B41J 2/17523* (2013.01); *B41J 2/17553* (2013.01)

(58) Field of Classification Search
CPC .. B41J 2/17513; B41J 2/17523; B41J 2/1753; B41J 2/17553
USPC ........................................................... 347/86
See application file for complete search history.

(56) References Cited

U.S. PATENT DOCUMENTS 5,506,608 A * 4/1996 Marler .................. B41J 2/1634 347/18
5,751,324 A 5/1998 Brandon et al.
6,280,013 B1 * 8/2001 Wade ..................... B41J 2/1408 347/17
6,398,354 B1 6/2002 Lattuca et al.
7,658,470 B1 * 2/2010 Jones ................... B41J 2/14072 347/50
8,708,459 B2 4/2014 Nishimura et al.
9,987,644 B1 6/2018 Anderson, Jr.
10,479,079 B2 11/2019 Kimura et al.
2007/0206067 A1 * 9/2007 Blackburn ............ B41J 2/1753 347/85
2011/0067810 A1 3/2011 Sato et al.
2020/0238695 A1 * 7/2020 Chen ....................... B41J 2/175

* cited by examiner

*Primary Examiner* — Matthew Luu
*Assistant Examiner* — Alexander D Shenderov
(74) *Attorney, Agent, or Firm* — Luedeka Neely, P.C.

(57) ABSTRACT

A fluid cartridge having a plastic fluid body, a bottom wall having a fluid supply opening therein. A metal insert is adhesively attached to the bottom wall. The metal insert has a fluid supply slot therein corresponding to the fluid supply opening in the bottom wall, a die bond surface adjacent to the fluid supply slot for adhesively attaching an ejection head chip thereto, and a plurality of air vents adjacent to the die bond surface. An ejection head chip is adhesively attached to the die bond surface of the metal insert.

19 Claims, 4 Drawing Sheets

FLUID CARTRIDGE WITH VENTED INSERT

TECHNICAL FIELD

The disclosure is directed to fluid supply cartridges for fluid ejection devices and in particular to fluid supply cartridges that provide improved dimensional stability for cartridge bodies used for ejecting a variety of fluids.

BACKGROUND AND SUMMARY

A conventional fluid cartridge body is typically constructed of one or more plastic materials to which a semiconductor ejection head chip is directly attached by means of a die bond adhesive. However, the use of solvent-based fluids in fluid ejection cartridges for inks and other commercial and industrial applications can cause the plastic materials to swell. Swelling of the plastic material of the cartridge body increases mechanical stresses on the silicon of the ejection head chip causing the chip to crack. Additionally, a mismatch of the coefficient of thermal expansion (CTE) between the plastic cartridge body and the ejection head chip causes swelling of the cartridge body during heat curing of the die bond adhesive. The resin material of the cartridge body may swell from about 3 to 5% during the die bond curing step. The swelling of the resin may cause the overall ejection head chip bow in the Y direction to a range of from −5 um to >40 um over a period of 4 weeks. Any imperfection or defects in the ejection head chip generated by deep reactive ion etching (DRIE) or dicing of the ejection head chips from a silicon wafer may provide additional stress concentration areas which can lead to ejection head chip cracking when installed on a plastic cartridge body.

Accordingly, there is a need for a dimensionally stable surface for attaching and ejection head chip thereto that has a coefficient of thermal or mechanical expansion similar to that of the ejection head chip. What is also needed is an ejection head chip bonding surface that is chemically stable for use with fluids that cause plastic materials to swell.

In view of the foregoing, the disclosure provides a fluid cartridge having a plastic fluid body and a bottom wall having a fluid supply opening therein. A metal insert is adhesively attached to the bottom wall. The metal insert has a fluid supply slot therein corresponding to the fluid supply opening in the bottom wall, a die bond surface adjacent to the fluid supply slot for adhesively attaching an ejection head chip thereto, and a plurality of air vents adjacent to the die bond surface. An ejection head chip is adhesively attached to the die bond surface of the metal insert.

In another embodiment, there is provided a method for eliminating mechanical stresses on an ejection head chip. The method includes providing a fluid cartridge having a plastic fluid body and a bottom wall having a fluid supply opening therein. A metal insert is adhesively attached to the bottom wall, wherein the metal insert has a fluid supply slot therein corresponding to the fluid supply opening in the bottom wall, a die bond surface adjacent to the fluid supply slot for adhesively attaching an ejection head chip thereto, and a plurality of air vents adjacent to the die bond surface. An ejection head chip is adhesively attached to the die bond surface of the metal insert. A flexible circuit is electrically connected to the ejection head chip.

In some embodiments, the metal insert is a machined, molded, or stamped metal insert.

In some embodiments, the metal insert is made of aluminum or stainless steel. In other embodiments, the metal insert is made of an anodized aluminum.

In some embodiments, the metal insert has a stamped chip pocket in the die bond surface for adhesively attaching the ejection head chip therein. In other embodiments, the chip pocket includes a racetrack circumscribing the fluid supply slot.

In some embodiments, the metal insert includes a deck area between the chip pocket and the air vents for a die bond adhesive that is effective to electrically and chemically insolate a back side of the flexible circuit from the metal insert and from corrosive fluids.

In some embodiments, the metal insert has a thickness ranging from about 1.5 to about 4 millimeters.

In some embodiments, the cartridge body includes at least two guide pins extending orthogonally from the bottom wall. In other embodiments, the metal insert has apertures therein corresponding to the at least two guide pins for positioning the metal insert on the bottom wall of the cartridge body.

In some embodiments, a flexible circuit is electrically connected to the ejection head chip.

An unexpected advantage of embodiments of the disclosure is the flatness of the ejection head chip after curing the die bond adhesive when using a metal insert between the ejection head chip and the bottom wall of the cartridge body. Without the metal insert, the ejection head chip may bow during curing of the die bond adhesive causing inaccurate placement of fluid droplets ejected from the ejection head. Another advantage of the disclosed embodiments is that a wider variety of fluids may be used with the fluid cartridge and ejection head without causing ejection head chip cracking due to swelling of the resin of the plastic cartridge body.

DETAILED DESCRIPTION OF THE DISCLOSED EMBODIMENTS

Figure 1:
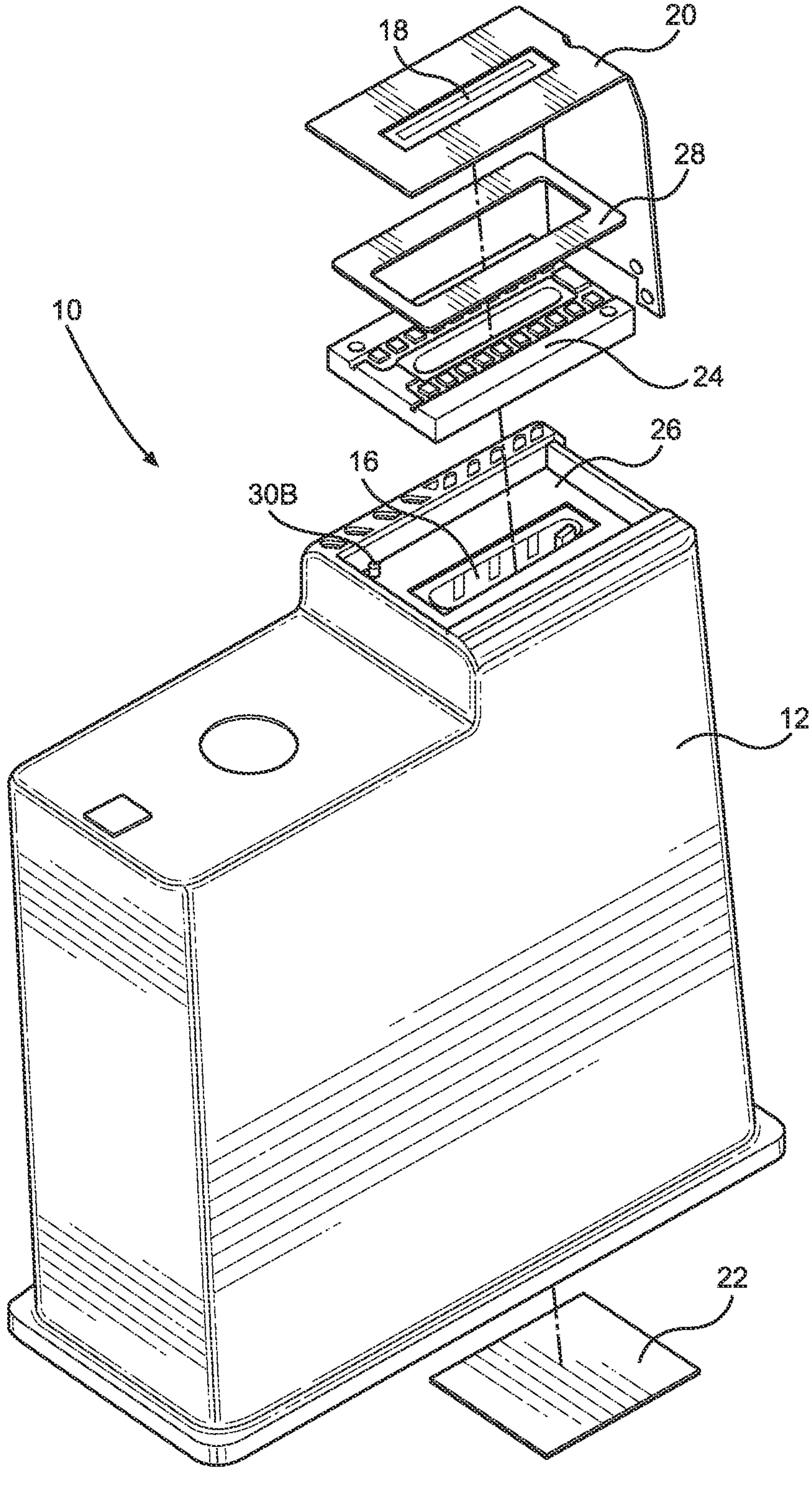
FIG. 1 is an exploded, perspective bottom view of a fluid cartridge according to the disclosure.
Figure 2:
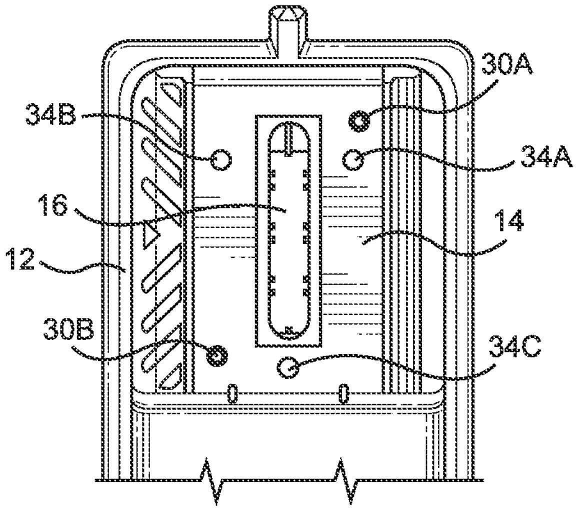
FIG. 2 is a plan bottom view of a portion of the fluid cartridge showing details of a bottom wall of the fluid cartridge of FIG. 1.
Figure 3:
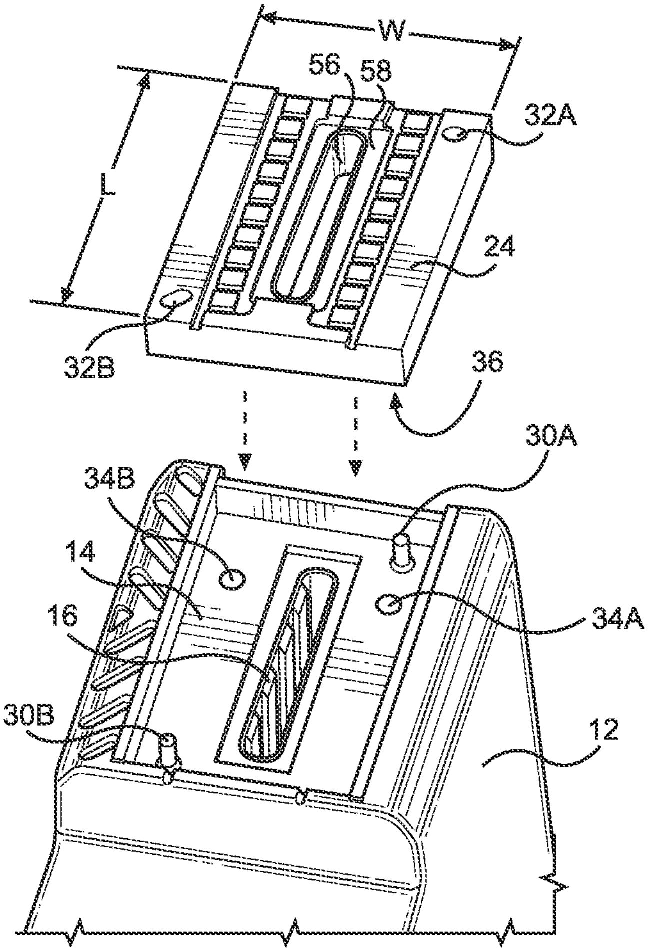
FIG. 3 is a partial perspective view of the fluid cartridge of FIG. 1 and metal insert therefor.

With reference the figures, FIG. 1 is an exploded, bottom view of a fluid cartridge 10 according to an embodiment of the disclosure. The fluid cartridge 10 includes a plastic cartridge body 12 made from a polymeric thermoplastic resin such as polyethylene, polypropylene, polyamide, polystyrene, and the like. As shown in FIGS. 2-3, a bottom wall 14 of the cartridge body 12 contains a fluid supply opening 16 therein for providing fluid from the cartridge body 12 to an ejection head chip 18 that is electrically attached to a flexible circuit 20. A fluid filter 22 is provided in the cartridge body 12 on a filter tower structure to filter the fluid flowing to the ejection head chip 18.

According to an embodiment of the disclosure, a metal insert 24 is attached by means of a first adhesive 26 to the bottom wall 14 of the cartridge body 12. A second adhesive 28 is used to bond the flexible circuit 20 to the metal insert 24 while also insulating the metal insert from lead beams on the flexible circuit 20. The metal insert 24 has an overall thickness ranging from about 1.5 to about 4 mm in thickness and will typically have a thickness ranging from about 1.75 to about 2.5 mm. The length L of the metal insert 24 may range from about 18 to about 25 mm and the width W of the metal insert 24 may range from about 12 to about 14 mm. A particularly suitable metal insert 24 is a machined, molded, or stamped metal insert formed from a metal selected from aluminum and stainless steel. The aluminum may be an anodized aluminum or the metal insert may include an inert coating to prevent flocculation of solids from fluids ejected by the ejection head chip 18.

Figure 4:
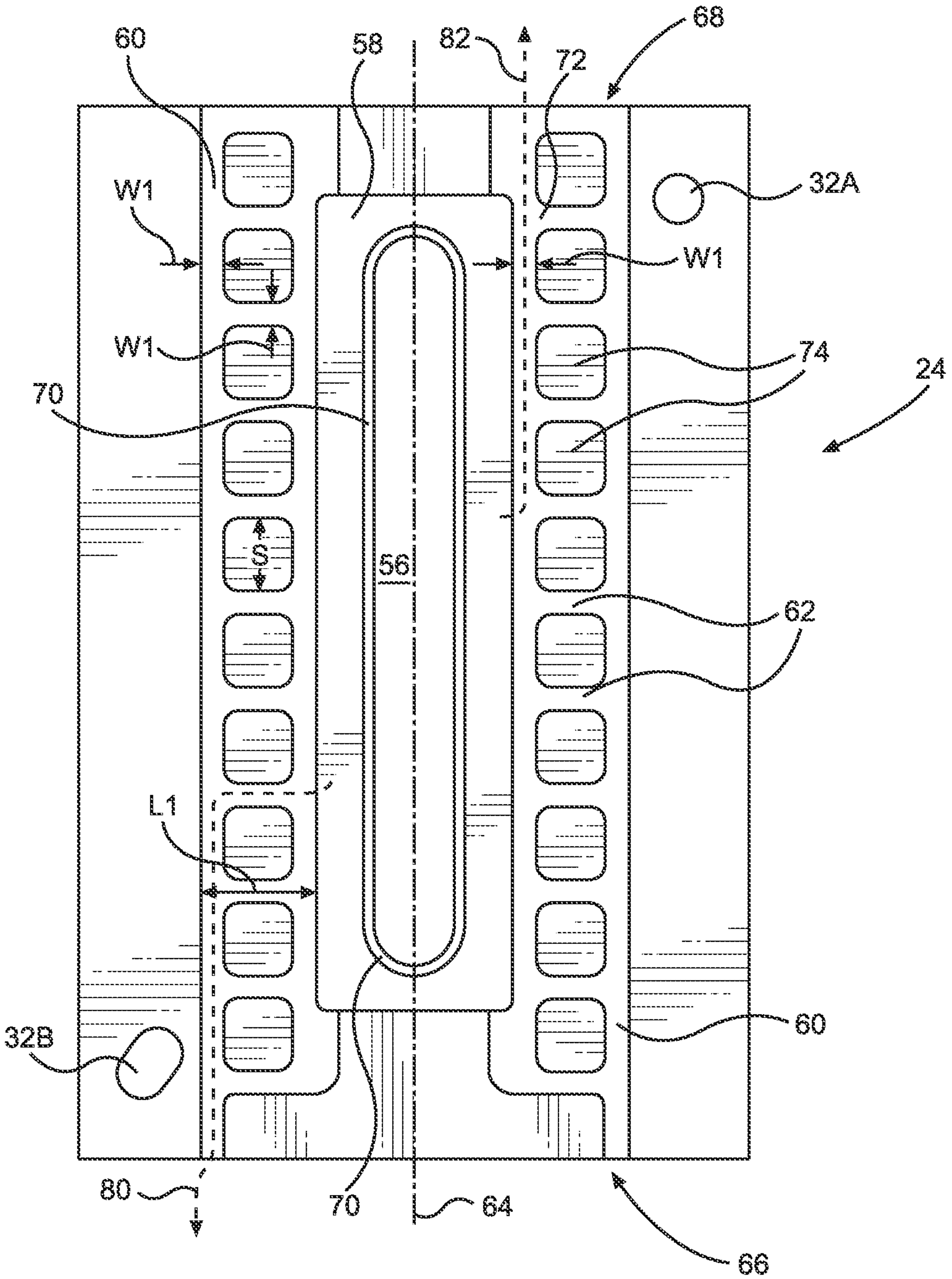
FIG. 4 is a plan view of top side of the metal insert for the fluid cartridge of FIG. 1 according to an embodiment of the disclosure.

The bottom wall 14 of the cartridge body 12 also includes at least two guide pins 30A and 30B for guiding the metal insert 24 into place on the bottom wall 14 of the cartridge body 12. As shown in FIG. 4, the metal insert 24 includes apertures 32A and 32B therein corresponding to the guide pin locations on the bottom wall 14 of the cartridge body 12 to enable easy placement of the metal insert 24 on the bottom wall 14 of the cartridge body 12 as shown in FIGS. 1 and 3.

Another feature of the bottom wall 14 of the cartridge body 12 is the planarization pads 34A-34C that provide a substantially planar surface for the attachment of the metal insert 24 to the bottom wall 14 of the cartridge body 12. The planarization pads 34A-34C may be raised pads molded into the bottom wall 14 of the cartridge body 12 or machined to provide a planar surface to which the metal insert 24 is adhesively attached.

The first adhesive 26 used to attach the metal insert 24 to the bottom wall 14 of the cartridge body 12, may be a heat curable epoxy adhesive that is compatible with the resin used to make the cartridge body 12. In order to enhance adhesion between the metal insert 24 and the bottom wall 14, the underside 36 of the metal insert 24 may be cleaned and treated with water, isopropyl alcohol, or silane. The underside 36 may also be blasted with a high pressure stream of air or aluminum oxide to enhance adhesion. Likewise, the bottom wall 14 of the cartridge body may be coated with an adhesion enhancing coating such as a silane coating.

Figure 5:
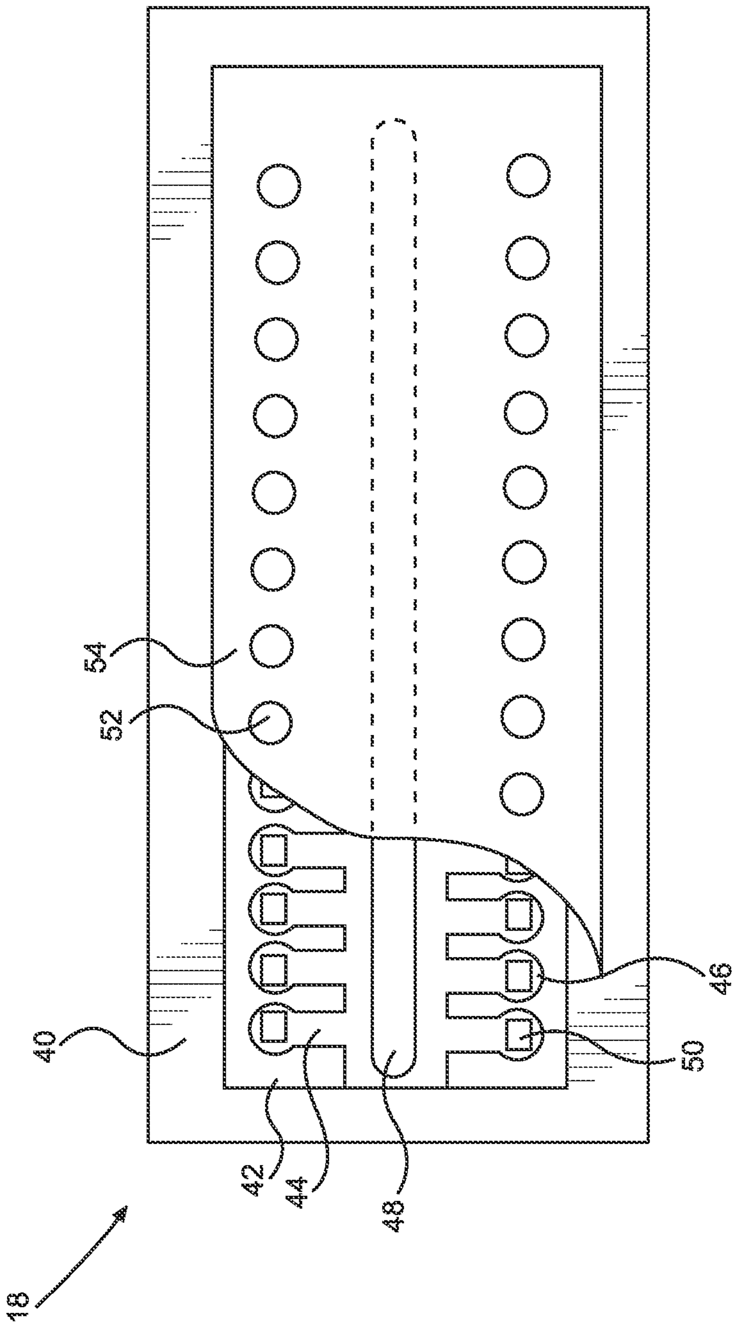
FIG. 5 is a plan view, not to scale, of a fluid ejection chip for the fluid cartridge of FIG. 1.

Once the metal insert 24 is adhesively attached to the bottom wall 14 of the cartridge body, the ejection head chip 18 may be adhesively attached to the metal insert 24 using a die bond adhesive. A conventional ejection head chip 18 is illustrated in FIG. 5 and includes a silicon semiconductor substrate 40 that includes a flow feature layer 42 made from a photoresist material having fluid channels 44 and fluid chambers 46 photoimaged therein. A fluid supply via 48 is etched through the semiconductor substrate 40 and imaged in the flow feature layer 42 and provides fluid to the fluid channels 44 and fluid chambers 46. Each of the fluid chambers 46 includes a fluid ejection device 50 that may be selected from a resistor heater or a piezoelectric device for ejecting fluid from the fluid chambers 46 through associated nozzle holes 52 in a nozzle plate 54 attached to the flow feature layer 42. Because a fluid supply via 48 in the ejection head chip 18 must be precisely aligned with a fluid supply slot 56 in the metal insert 24 in order to provide fluid to fluid ejectors 50 on the fluid ejection chip 18, a chip pocket 58 is provided in the metal insert 24 (FIG. 3) and the ejection head chip 18 is adhesive attached to the metal insert 24 in the chip pocket 58. The chip pocket 58 is a recessed area in the metal insert 24 that provides a somewhat confined area for the die bond adhesive. The fluid supply slot 56 in the metal insert 24 has a length ranging from about 14.8 mm to about 15.6 mm and a width ranging from about 1.5 to about 2.0 mm.

The flexible circuit 20, which is used to connect fluid ejectors 50 on the ejection head chip 18 with a control activation device for the fluid ejectors 50, surrounds the ejection head chip 18 and is fastened to the metal insert 24 using the second adhesive 28, also known as a pre-form pressure sensitive adhesive. The flexible circuit 20 includes a plurality of beams which extend therefrom and electrically connect with bond pads (not shown) on the semiconductor substrate 40 of the ejection head chip 18. After the ejection head chip 18 is placed within the chip pocket 42 and the flexible circuit 20 is attached to the ejection head chip 18, an ultraviolet (UV) photosensitive adhesive is applied along the sides of the ejection head chip 18, over the beams, as an encapsulant and protectant to prevent shorting by the metal insert 24 and corrosion from fluid ejected by the ejection head chip 18. A light source is applied to the UV adhesive to cure the same. However, a portion of the UV adhesive which flows around and behind the beams is not exposed to the applied UV light source, and therefore is not cured thereby.

Once the fluid cartridge 10 is fully assembled, the fluid cartridge 10 is placed within an oven and the die bond adhesive is cured at an elevated temperature to permanently affix the ejection head chip 18 to the metal insert 24. During the curing process, the adhesive may produce gas which forms gas bubbles in the adhesive. Some of the gas may remain entrapped within the adhesive as residual gas bubbles after the curing process is finished. Such gas bubbles, because of the void left in the adhesive, may affect the bond strength between the ejection head chip 18 and the metal insert 24. Moreover, other gas bubbles may expand at the elevated cure temperature and/or join with adjacent gas bubbles to form passageways or channels within the adhesive. Such a phenomenon, known as "die bond channeling," may result in channels which extend from the fluid supply slot 56 within the metal insert 24 to the ambient environment, thereby allowing fluid to leak from the fluid cartridge assembly to the ambient environment. Alternatively, in the case of a multi-fluid cartridge assembly, the channels formed in the adhesive may allow cross-contamination between the different fluids within the cartridge body 12.

Additionally, the uncured UV or thermally cured epoxy adhesive is subsequently cured and/or volatilized by the heating process used to cure the die bond adhesive. During the heat curing process, the UV and/or thermally cured epoxy adhesive may also produce gas. Because the UV and/or thermally cured epoxy adhesive placed over the beams on each side of the ejection head chip 18 has previously been cured, and the flexible circuit 20 is affixed to the metal insert 24 and surrounds the ejection head chip 18, gas which is produced during the heat curing process may expand (because of the increased temperature) and flow through the die bond adhesive and UV adhesive toward and into the fluid supply slot 56 within the metal insert 24 creating channels for leaking of fluid from the fluid supply cartridge out to the ambient environment.

Accordingly, the metal insert 24 is configured with at least one air vent, and preferably, a plurality of air vents adjacent to the chip pocket 58 to enable air to escape from the die bond adhesive and/or UV adhesive during the curing process. With reference again to FIG. 4, the metal insert 24 includes a plurality of grooves 60 and 62 adjacent to the chip pocket 58 that provide air flow communication from the chip pocket 58 to the ambient atmosphere. Grooves 60 define one or more longitudinal grooves (extending substantially parallel to a longitudinal direction of chip pocket 58 along longitudinal axis 64), and grooves 62 define a plurality of lateral grooves extending between chip pocket 56 and longitudinal grooves 60. Longitudinal grooves 60 extend to edges 66 and 68 disposed adjacent to the ambient environment. The combination of longitudinal grooves 60 and 72, lateral grooves 62 that are in flow communication with the ambient atmosphere at edges 66 and 68 of the metal insert 24 provide the plurality of air vents for the insert 24. Exemplary air flow through the grooves 60, 62 and 72 from the chip pocket 58 to edges 66 and 68 are represented by arrows 80 and 82.

The grooves have dimensions corresponding to the dimensions represented by the reference letters W1, S and L1. The dimension W1 is preferably between 0.15 and 0.75 mm, and more preferably between 0.2 and 0.3 mm. The dimension S is preferably between 0.75 and 2.5 mm, and more preferably between 1 and 2 mm. The dimension L1 is preferably between 1.0 and 4.0 mm, and more preferably between 1.5 and 2.5 mm. Further, grooves 60 and 62 have a depth (substantially perpendicular to the drawing in FIG. 4) which is preferably between 0.1 and 0.5 mm, and more preferably between 0.25 and 0.35 mm. A raised racetrack 70 having a height ranging from about 0.04 to about 0.1 mm and a width ranging from about 0.15 mm to about 0.5 mm circumscribes the fluid supply slot 56 to prevent a die bond adhesive applied in the chip pocket from 58 from flowing into the fluid supply slot 56. An internal longitudinal groove 72 having the width W1 is provided between the chip pocket 58 and the raised structures 74 to provide a raised landing area relative to the chip pocket 58 for the die bond and/or UV adhesive to coat the back side of the lead beams on the flexible circuit 20 and to prevent short circuiting between the flexible circuit 20 and the metal insert 24.

During the heat curing process for the die bond adhesive and/or the UV adhesive, any gas generated will flow from the lateral grooves 62 to the longitudinal grooves 60 and 72 and out to the ambient atmosphere at the edges 66 and 68 of the metal insert rather than flowing inward toward the fluid supply slot 56. Accordingly, air channels in the adhesive are avoided by use of the metal insert 24 containing the grooves 60, 62, and 72.

An advantage of having the ejection head chip 18 bonded to the metal insert 24 rather than to the plastic cartridge body 12 is that the metal insert 24 provides a mechanically stable surface for the ejection head chip 18 so that any swelling or distortion of the plastic cartridge body 12 is isolated from the ejection head chip 18. Accordingly, a wider variety of fluids may be ejected with a fluid cartridge 10 have the metal insert 24 as described above, including organic fluids that may cause the resin of the cartridge body 12 to swell. In some embodiments, when using a metal insert 24, the metal insert 24 may also provide a heat sink for cooling the ejection head chip 18 during fluid ejection.

While the foregoing embodiments are directed specifically to metal inserts, other dimensionally stable materials, such as ceramic and carbon fiber reinforced polymers may be used as an insert. Such alternative materials may also be formed with vents as described above to prevent air channels from forming in the bonding adhesives during heat curing cycles.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A fluid cartridge comprising:

a plastic fluid body having a bottom wall having a fluid supply opening therein;

a metal insert adhesively fastened to the bottom wall of the plastic fluid body, the metal insert having a fluid supply slot therein corresponding to the fluid supply opening in the bottom wall, a die bond surface adjacent to the fluid supply slot configured for adhesively fastening an ejection head chip thereto, and a plurality of air vents adjacent to the die bond surface; and an ejection head chip adhesively fastened to the die bond surface of the metal insert.

2. The fluid cartridge of claim 1, wherein the metal insert is a stamped, machined, or molded metal insert.

3. The fluid cartridge of claim 1, wherein the metal insert comprises aluminum or stainless steel.

4. The fluid cartridge of claim 3, wherein the metal insert comprises anodized aluminum.

5. The fluid cartridge of claim 1, wherein the metal insert further comprises a stamped chip pocket in the die bond surface configured for adhesively fastening the ejection head chip therein.

6. The fluid cartridge of claim 5, wherein the chip pocket further comprises a racetrack circumscribing the fluid supply slot.

7. The fluid cartridge of claim 5, wherein the metal insert further comprises a deck area between the chip pocket and the air vents for a die bond adhesive that is effective to electrically and chemically insolate a back side of a flexible circuit from the metal insert and corrosive fluids.

8. The fluid cartridge of claim 1, wherein the metal insert has a thickness ranging from about 1.5 to about 4 millimeters.

9. The fluid cartridge of claim 1, further comprising at least two guide pins extending orthogonally from the bottom wall.

10. The fluid cartridge of claim 9, wherein the metal insert further comprises apertures therein corresponding to the at least two guide pins configured for positioning the metal insert on the bottom wall of the cartridge body.

11. The fluid cartridge of claim 1, wherein further comprising a flexible circuit electrically connected to the ejection head chip.

12. A method for eliminating mechanical stresses on an ejection head chip comprising:

providing a fluid cartridge comprising a plastic fluid body having a bottom wall having a fluid supply opening therein;

adhesively attaching a metal insert to the bottom wall, wherein the metal insert has a fluid supply slot therein corresponding to the fluid supply opening in the bottom wall, a die bond surface adjacent to the fluid supply slot for adhesively attaching an ejection head chip thereto, and a plurality of air vents adjacent to the die bond surface;

adhesively attaching an ejection head chip to the die bond surface of the metal insert; and electrically connecting a flexible circuit to the ejection head chip.

13. The method of claim 12, wherein the metal insert is a stamped metal insert.

14. The method of claim 12, wherein the metal insert comprises aluminum or stainless steel, further comprising coating the metal insert with an inert coating to prevent flocculation of solids from fluids ejected by the ejection head chip.

15. The method of claim 12, wherein the metal insert comprises a stamped chip pocket within the die bond surface having a racetrack circumscribing the fluid supply slot, further comprising applying a die bond adhesive in the chip pocket for adhesively attaching the ejection head chip to the metal insert in the chip pocket.

16. The method of claim 15, wherein the metal insert comprises a deck area between the chip pocket and the air vents, further comprising applying a die bond adhesive in the deck area to electrically and chemically insolate a back side of the flexible circuit from the metal insert and corrosive fluids.

17. The method of claim 12, further comprising stamping the metal insert from aluminum or stainless steel having a thickness ranging from about 1.5 to about 4 millimeters.

18. The method of claim 12, further comprising molding at least two guide pins to extend orthogonally from the bottom wall of the cartridge body.

19. The method of claim 18, further comprising providing apertures in the metal insert corresponding to the at least two guide pins, and positioning the metal insert on the bottom wall of the cartridge body using the two guide pins and apertures.

* * * * *